United States Patent [19]
Muchin et al.

[11] Patent Number: 5,806,410
[45] Date of Patent: *Sep. 15, 1998

[54] FOOTED COOKING UTENSIL

[75] Inventors: Jay Z. Muchin, Manitowoc; Todd W. Kroscher, Two Rivers, both of Wis.

[73] Assignee: Newell Operating Co., Ill.

[ * ] Notice: The term of this patent shall not extend beyond the expiration date of Pat. No. 5,644,976.

[21] Appl. No.: 851,578

[22] Filed: May 5, 1997

Related U.S. Application Data

[63] Continuation of Ser. No. 509,557, Jul. 31, 1995, Pat. No. 5,644,976.

[51] Int. Cl.⁶ .................................................. A47J 37/01
[52] U.S. Cl. .................. 99/422; 99/DIG. 15; 220/574; 220/632; 220/912
[58] Field of Search ........................ 99/422, 426, 432, 99/433, DIG. 15, 451, DIG. 14; 219/425, 432; 220/574, 912, 628, 632

[56] References Cited

U.S. PATENT DOCUMENTS

| | | | |
|---|---|---|---|
| 1,993,590 | 3/1935 | Brown | 220/574 |
| 2,704,974 | 3/1955 | Setman | 99/422 |
| 3,746,837 | 7/1973 | Frey et al. | 99/397 |
| 4,112,916 | 9/1978 | Guibert | 99/426 |
| 5,223,685 | 6/1993 | DeRienzo, Jr. | 219/732 |
| 5,351,608 | 10/1994 | Muchin et al. | 99/422 |
| 5,433,140 | 7/1995 | Ogee | 99/457 |

*Primary Examiner*—Reginald L. Alexander
*Attorney, Agent, or Firm*—Foley & Lardner

[57] ABSTRACT

An improved footed cooking utensil is provided whereby the cooking utensil may be removed from a hot oven and placed directly on a counter-top or other surface without the need for a hot pad, cutting board, or similar device. The cooking utensil of the present invention includes foot supports which suspend the lower surface of the cooking utensil above the counter-top thereby eliminating contact between the counter-top and hot metal. The low heat capacity footings do not retain heat and any heat absorbed during the baking process is quickly dissipated upon removal of the utensil from the oven. One or more footings may be applied to metal cookware, ceramic cookware or cookware fabricated from other materials.

20 Claims, 4 Drawing Sheets

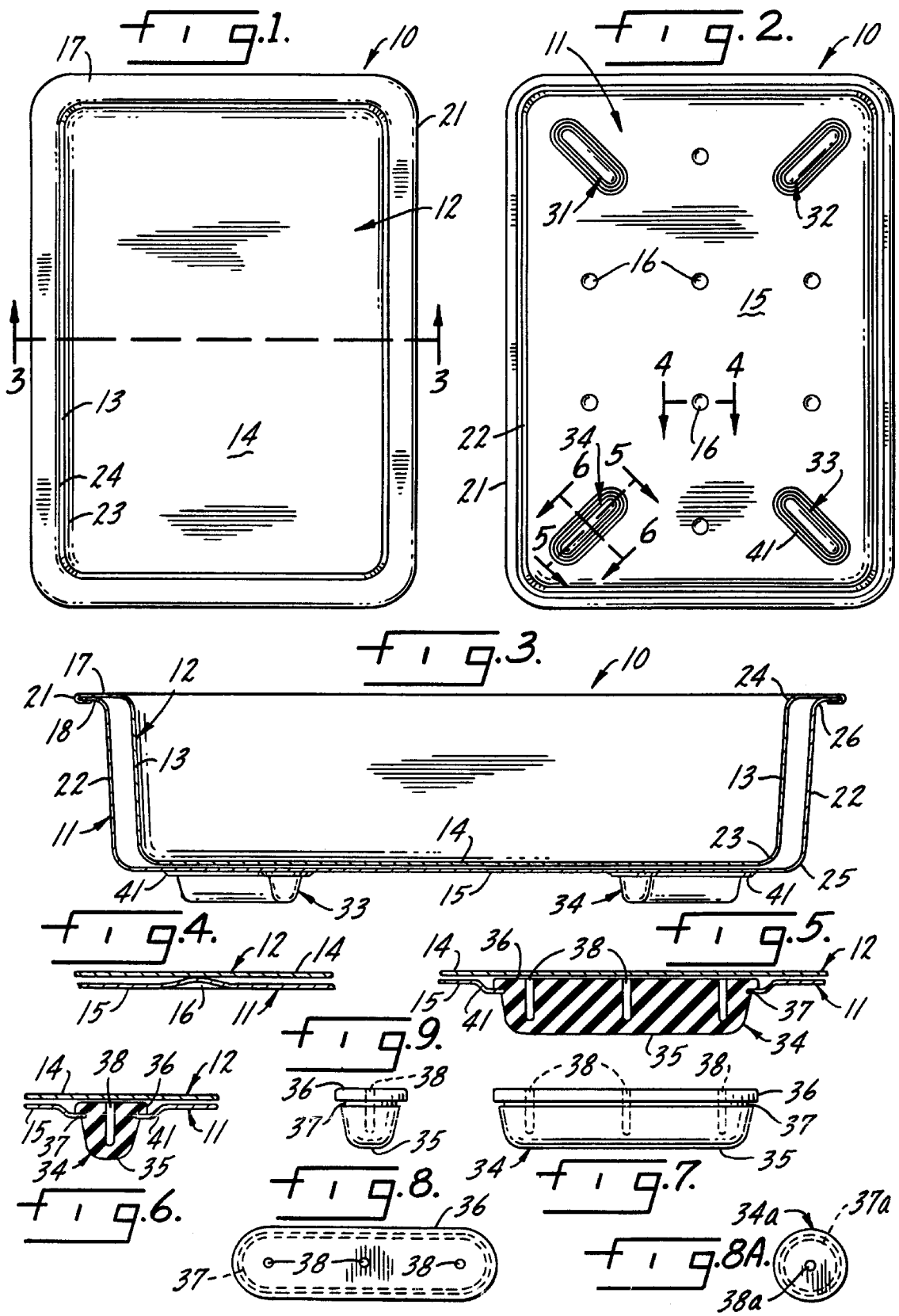

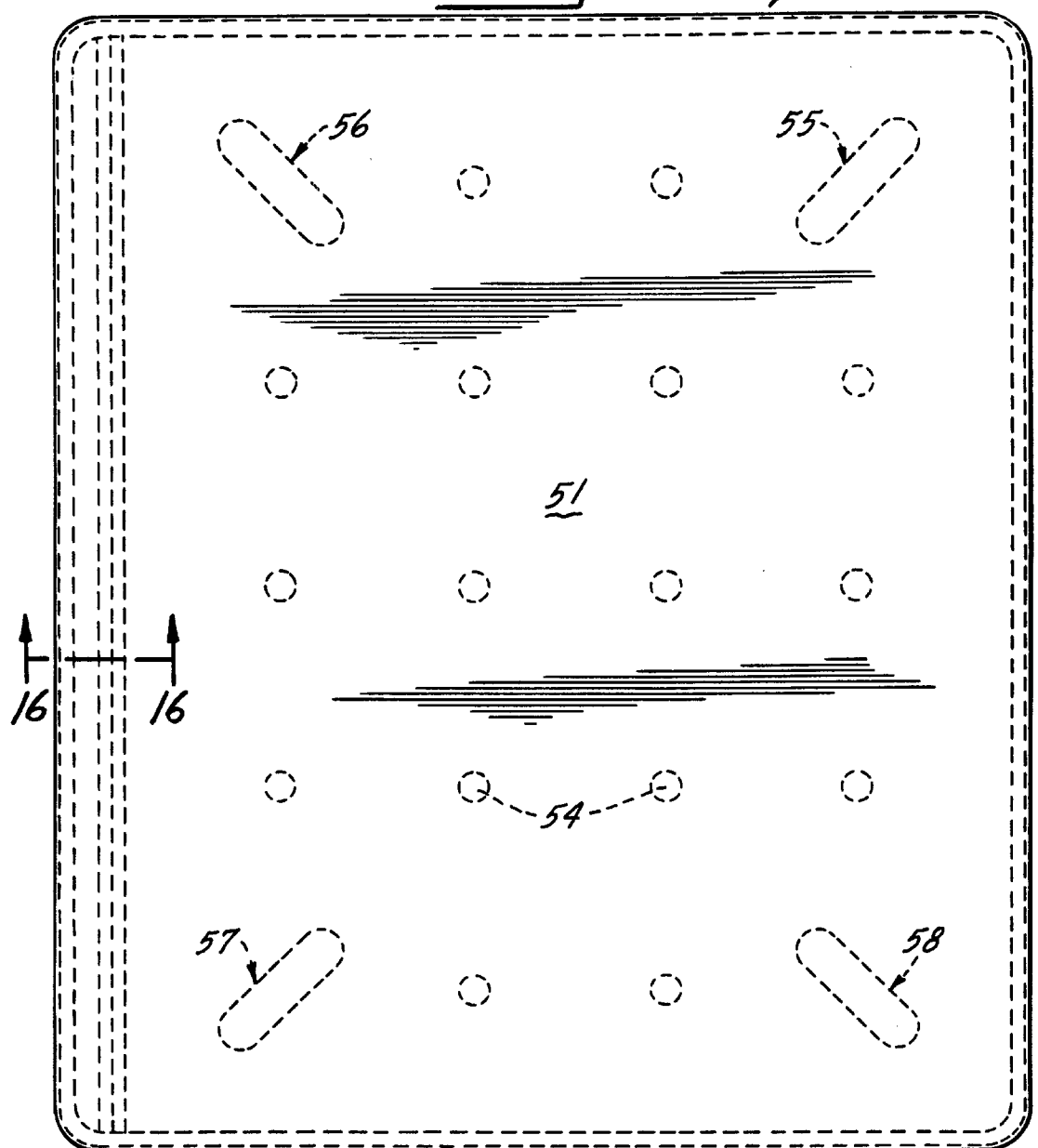

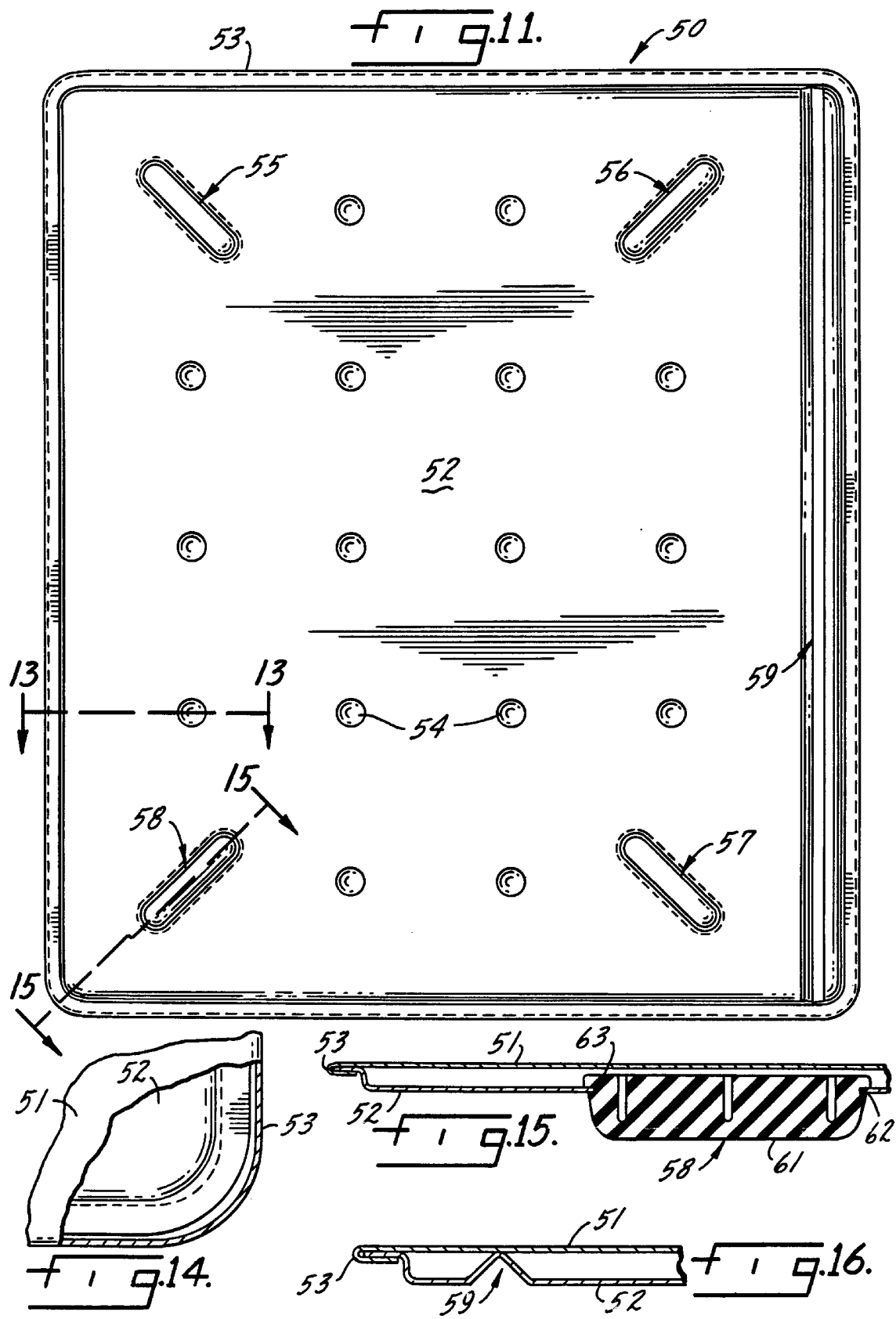

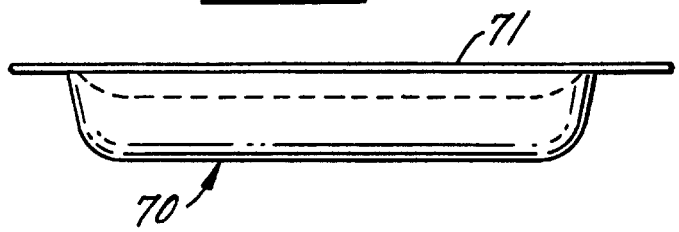
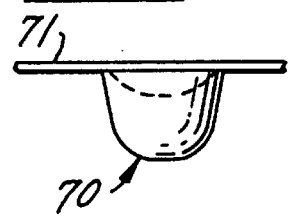
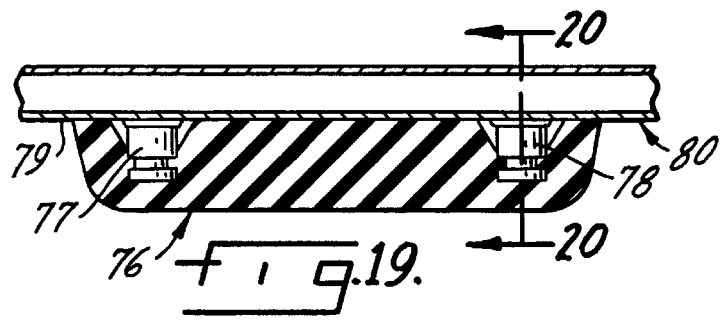
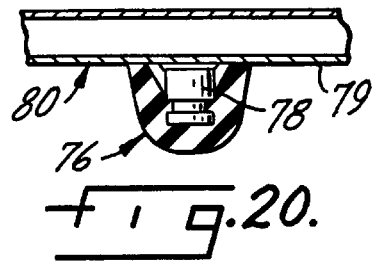
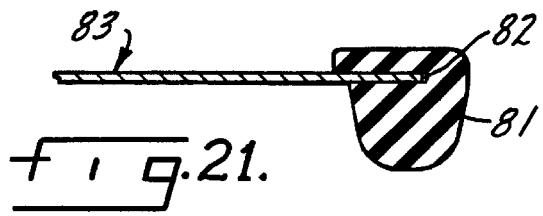
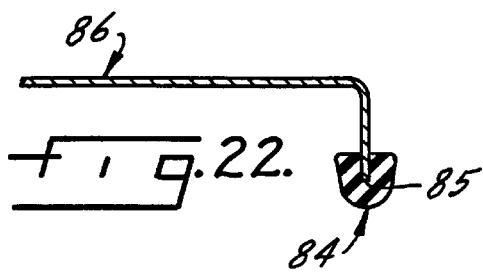

FOOTED COOKING UTENSIL

This is a continuation of 08/509,557 filed on Jul. 31, 1995, now U.S. Pat. No. 5,644,976.

FIELD OF THE INVENTION

The present invention relates to cooking utensils and more specifically to cooking utensils and pans used for baking. Still more specifically, the present invention relates to cooking utensils with low heat capacity foot supports associated therewith, so that the utensil may be removed from a hot oven and placed directly on a counter-top, table-top or other cooling surface without the need for employing a hot pad or similar device.

BACKGROUND OF THE INVENTION

Ovens intended for home use can reach temperatures approaching 550° F. during broiling operations and 450° F. during baking operations. When food articles are baked, they are normally placed on a cooking utensil such as a cookie sheet or a pan-type structure that includes sidewalls. One problem constantly encountered by the consumer is the tendency to remove the cooking utensil from a hot oven before placing the hot utensil directly on a counter-top or other surface. Most counter-tops cannot withstand hot metal items approaching 450° F. Hence, if a hot utensil is removed from a hot oven and placed directly on the counter-top, the counter-top will be burned and cannot normally be repaired. Further, other surfaces such as table-tops or cabinets can also be damaged by hot baking utensils.

Not only will a consumer often forget to place a hot-pad or cutting board underneath a utensil just removed from an oven, a consumer will also be forced to place a hot utensil on the counter-top or other surface if a hot-pad or cutting board is not readily available. Often, cutting boards are used for other purposes and hot-pads may have been misplaced, soiled, or otherwise unavailable. Then, the consumer may be forced to place a hot pan on the counter-top which will cause damage to the counter-top or in the kitchen sink which may be dirty or contain other items that might be damaged if contacted by the hot utensil. Consumers often place hot items on a stove top when no other safe cooling place is available. However, stove tops are uneven and therefore are unsatisfactory for this purpose.

Therefore, there is a great need for cooking utensils, cooking pans and cookie sheets that can be removed from a hot oven at temperatures reaching 450° F. and placed directly on counter-tops or other surfaces without the need for a cutting board, a hot-pad or similar device placed between the counter-top or surface and the hot cooking utensil. Such an improvement to cooking utensils would save consumers from costly repairs to counter-tops and the anguish associated with causing an unsightly and irreparable burn to the counter-top. A cooking utensil that does not require a hot pad will also allow a cook to maximize the use of available space in a kitchen because any flat surface would be usable for cooking just-baked items.

SUMMARY OF THE INVENTION

The present invention satisfies the aforenoted need for providing a cooking utensil having an upper surface for accommodating an article of food to be cooked and a hot exposed lower surface. The utensil includes a means for supporting the lower surface of the utensil above a counter-top so the cooking utensil may be removed from a hot oven and placed immediately on top of the counter-top without fear of burning or scarring the counter-top.

The means for supporting the lower surface of the cooking utensil above the counter-top may be provided in a variety of forms. One general form is one or more support feet disposed on the lower surface of the cooking utensil. The support feet are preferably fabricated from a dense polymer material. Silicone rubber is one suitable material because of its low heat capacity and high heat resistance. Thus, a metal cooking utensil may be heated to temperatures of up to 450°–550° F. in an oven and, upon removal of the utensil from the oven, the majority of any heat contained in the silicone footing is dissipated quickly and there is an insufficient amount of heat contained in the silicone footing to cause any damage to the conventional counter-top. A footing may be disposed near each corner of a rectangular cooking utensil or as little as three small footings may be employed. The footings are preferably disposed at a 45° angle with respect to the edges of the utensil so that they effectively bridge the wire members of an oven rack. It will be readily apparent to those skilled in the art that as few as one footing (i.e. a single circular footing) or as many as four or more footings may be employed to support the lower surface of the cooking utensil above the counter-top.

The preferred footing is of a form that may be attached to the cooking utensil without the need of fasteners or adhesives. Specifically, the preferred footing of the present invention includes a lower portion that is disposed below the lower surface of the cooking utensil and an upper portion or "heel" that is connected to or accommodated within an aperture disposed in the lower surface of the cooking utensil. The upper portion of the footing preferably includes a "necked-down" portion that is snugly accommodated within an aperture disposed in the lower surface of the cooking utensil. During manufacture, the lower portion of the footing is pushed downward through the aperture in the cooking utensil. The sidewalls of the lower portion of the footing frictionally engage the edges of the aperture and therefore a downward force is required to force the lower portion of the footing through the aperture. As the lower portion of the footing is forced downward through the aperture, the necked-down portion approaches the edges which define the aperture. As the necked-down portion of the footing reaches the edges of the aperture, the necked-down portion snaps into place and is snugly accommodated within the aperture disposed in the lower surface of the utensil. Then, the footing is positioned with the upper portion or heel disposed above the aperture and the lower portion disposed below the aperture while the necked-down portion is disposed or accommodated in the aperture. The upper portion or heel is of sufficient thickness and width so that it cannot be pulled downward through the aperture.

To facilitate manufacture of the utensil, the footings may be provided with one or more vertical holes disposed in the top or upper portion of the footing. The holes may accommodate a probe or probes that are used to push the footing downward through the aperture in the lower surface of the utensil. After the footing is pushed downward into place, the probes may be quickly and easily withdrawn.

In the preferred embodiment, the cooking utensil includes two layers. The aperture that accommodates the footing is disposed in the lowermost layer and the upper portion or heel of the footing is accommodated between the two layers after the footing is pushed through the aperture disposed in the lowermost Is layer of the utensil. Thus, the upper layer of the two-layered utensil includes no apertures and is available to provide a smooth surface for cooking food.

The present invention may also be employed with single sheet utensils. For example, the footings may be glued to the underside of a single sheet utensil with a suitable glue or adhesive. Or, the footings may be attached with studs or fasteners that are welded or otherwise mounted to the undersurface of the utensil. Still another embodiment of the present invention involves a footing in the form of one or more strips mounted along an outer edge of a cooking utensil. For example, some cookie sheets have flat outer edges and may even employ outer edges which turn downward. For those types of utensils, a strip may be mounted along the outer edge and the strip may be of a sufficient thickness to support the lower surface of the cooking utensil above the counter-top thereby avoiding any hot metal contact with the counter-top after the utensil is removed from the hot oven.

In addition to silicone rubber, other materials may be employed for the fabrication of the footings. Of course, an important criteria is low heat capacity, high melting point and a sufficient hardness. A Shore A hardness of 50 or more is preferable.

It is therefore an object of the present invention to provide an improved cooking utensil which may be transported directly from a hot oven to a conventional counter-top or other surface without the need for a hot-pad or cutting board underneath the utensil and without causing any burning or scarring of the counter-top.

Another object of the present invention is to provide improved bakeware which may be placed directly on the counter-top or table without the need for a hot-pad.

Another object of the present invention is to provide improved bakeware that may be cooled on any flat surface without the need for a hot pad or similar device thereby enabling a cook to maximize the use of available counter-space in a kitchen.

Another object of the present invention is to provide improved cake pans which will enable just-baked cakes to be cooled on top of the counter without special cooling racks.

Another object of the present invention is to provide an improved means for attaching hard silicone rubber material to metal material.

Other objects and advantages of the present invention will become apparent to those skilled in the art upon reading the following detailed description and appended claims, and upon reference to the accompanying drawings.

BRIEF DESCRIPTION OF THE DRAWINGS

The invention is illustrated more or less diagrammatically in the accompanying drawing wherein:

FIG. 1 is a top plan view of a cooking utensil made in accordance with the present invention;

FIG. 2 is a bottom plan view-of the cooking utensil of FIG. 1;

FIG. 3 is a section view taken substantially along line 3—3 of FIG. 1;

FIG. 4 is an enlarged section view taken substantially along 4—4 of FIG. 2;

FIG. 5 is a section view taken along 5—5 of FIG. 2;

FIG. 6 is a section view taken substantially along line 6—6 of FIG. 2;

FIG. 7 is a side view of a support footing made in accordance with the present invention;

FIG. 8 is a top view of the support footing shown in FIG. 7;

FIG. 8A is a top view at a round support footing;

FIG. 9 is an end view of the support footing shown in FIG. 7;

FIG. 10 is a top plan view of a second cooking utensil made in accordance with the present invention;

FIG. 11 is a bottom plan view of the cooking utensil shown in FIG. 10;

FIG. 12 is an end view of the cooking utensil shown in FIG. 10;

FIG. 13 is a section view taken substantially along the line 13—13 of FIG. 11;

FIG. 14 is an enlarged top view of one corner of the cooking utensil shown in FIG. 10;

FIG. 15 is a section view taken substantially along line 15—15 of FIG. 11;

FIG. 16 is a section view taken substantially along line 16—16 of FIG. 10;

FIG. 17 is a side plan view illustrating a rubber footing attached to a lower surface of a cooking utensil by an adhesive;

FIG. 18 is an end view of the footing shown in FIG. 17;

FIG. 19 is a vertical section view of a footing attached to a lower surface of a cooking utensil by means of studded fasteners;

FIG. 20 is a section view taken along line 20—20 of FIG. 19;

FIG. 21 is a partial side section view of a third cooking utensil made in accordance with the present invention; and FIG. 22 is a partial side section view of a fourth cooking utensil made in accordance with the present invention.

It should be understood that the drawings are not necessarily to scale, and that the embodiments are sometimes illustrated by graphic symbols, phantom lines, diagrammatic representations, and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE DRAWINGS

Like reference numerals will be used to refer to like or similar parts from Figure to Figure in the following description of the drawings.

FIGS. 1 through 6 illustrate one preferred embodiment of a cake pan made in accordance with the present invention. Specifically, referring first to FIG. 1, the cake pan or utensil 10 includes two layers, a bottom layer 11 and a top layer 12. Referring to FIG. 3,, the bottom layer 11 is spaced from the top layer 12 to provide an insulating layer of hot air disposed between the layers 11, 12. The insulating layer of air disposed between the bottom layer 11 and top layer 12 will prevent burning of the food along the inside sidewall indicated at 13 and upward-facing cooking surface indicated at 14. As seen in FIG. 4, the lower surface 15 of the bottom layer 11 includes an indentation 16 which supports the upper layer 12 in a spaced relationship above the lower layer 11 so that a layer of insulating air remains disposed between the layers 11 and 12. In addition to the indentation 16 as shown in FIG. 4, a variety of support means may be employed to provide the spaced relationship between the layers 11 and 12. For example, a bead or rib may be disposed between the layers 11 and 12 to support the layer 12 above the layer 11 in a spaced relationship. In addition, a number of other structural support means for supporting the layer 12 above the layer 11 will be apparent to those skilled in the art.

The connection of the flange 17 of the top layer 12 to the flange 18 of the bottom layer 11 at the outer edge 21 maintains the sidewall 13 of the top layer 12 in a spaced relationship from the outer sidewall 22 of the bottom layer 11. In addition, the corners 23, 24 of the top layer 12 and the corners 25, 26 of the bottom layer 11 provide structural stability to the sidewalls 13 and 22 to further insure that the spaced relationship between the sidewalls 13 and 22 is maintained.

Turning to FIG. 2, the lower surface 15 of the bottom layer 11 features four footings 31, 32, 33, 34 which support the lower surface 15 of the bottom layer 11 above a countertop or kitchen surface after the utensil 11 is removed from a hot oven. The attachment of the footings, such as 34 to the utensil 10 is illustrated in FIGS. 5–9.

Specifically, during construction, an aperture (not shown) is cut into the lower layer 11. The footing 34 is then pushed downward through the aperture. As seen in FIGS. 7–9, each footing includes a lower portion 35, a top or upper portion 36 (also known as a "heel") and a necked-down or grooved portion 37 disposed therebetween. Referring back to FIG. 5, the lower portion 35 of the footing 34 is pushed downward through the aperture disposed in the bottom layer 11 until the necked-down portion 37 (see FIGS. 7–9) is snugly accommodated in the aperture. The top portion 36 is thereafter disposed between the bottom layer 11 and top layer 12. Hence, no glues or fasteners are required to attach the footings 31, 32, 33, 34 to the utensil 10 as shown in FIGS. 1–9.

In addition, the footing 34 as illustrated in FIGS. 5–9 includes vertical holes all indicated at 38 which are used to accommodate probes (not shown) that push the footings 31, 32, 33, 34 downward through the bottom layer 11. The use of the vertical holes 38 and probes make it easier and faster to attach the footings 31, 32, 33, 34 to the utensil 10 thereby resulting in a cheaper product to the consumer. FIG. 8A illustrates the use of a round footing 34a which would be useful on muffin pans.

Still an additional feature of the utensil 10 shown in FIGS. 1 through 6 is the use of an indentation shown at 41 which accommodates the top portion 36 of the footing 34. The indentation 41 is provided in those cases where there is an insufficient amount of clearance between the two layers 11, 12 of the utensil 10 to accommodate the upper portion or heel 36 of the footings 34.

Turning to FIG. 10, a utensil 50 in the form of a cookie sheet or baking sheet is illustrated. Again, as seen in FIGS. 13, 15 and 16, a two-layer construction is utilized. Specifically, a top layer 51 is connected to a bottom layer 52 at the outer edge shown at 53. A plurality of indentations shown generally at 54 (FIG. 13) and 59 (FIG. 16) maintain the top layer 51 and bottom layer 52 in a spaced relationship. As noted with the indentation 16 shown on FIG. 4, a variety of structural support means will be apparent to those skilled in art for supporting the top layer 51 above the bottom layer 52 in a spaced relationship.

Turning to FIG. 11, the utensil 50 is provided with four footings 55, 56, 57, 58. The means for attaching each footing to the utensil 50 is shown in FIG. 15. Specifically, the bottom layer 52 is provided with four apertures for accommodating the footings, and, as in the case of FIG. 15, the footing 58. The bottom portion 61 of the footing is pushed downward through the bottom layer 52 until the necked-down or slotted portion 62 is accommodated in the aperture and the top portion 63 is disposed above the bottom layer 52. After the top layer 51 is attached to the bottom layer 52, the top portion 63 of the footing is disposed between the top layer 51 and bottom layer 52 and the bottom portion 61 of the footing 58 supports the bottom layer 52 above the kitchen counter-top or other surface.

FIGS. 17–22 illustrate additional alternative embodiments. Specifically, FIGS. 17 and 18 illustrate a footing 70 that is attached to a surface 71 by way of an adhesive (not shown). Use of an adhesive may be employed for single-sheet utensils as opposed to the two-layered utensils 10 and 50 discussed above. Suitable adhesives include high temperature, low volatility, industrial grade, silicone adhesives and sealants. One specific adhesive that is suitable for this purpose is sold under the name SUPERFLEXO™ 596 by Loctite Corporation. Another suitable adhesive is sold under the name MASTERSIL 711 by Masterbond, Inc.

FIGS. 19 and 20 illustrate the attachment of a footing 76 by way of two studded fasteners 77, 78. The studded fasteners 77, 78 are attached to the lower surface 79 of the bottom layer 80 by welding or other suitable means. The studded fasteners may also be employed with a single-layer utensil. The use of a rivet may also be employed to attach the footings to single-layer and dual-layer utensils.

Turning to FIGS. 21 and 22, alternative footing shapes are also available. Specifically, the footing 81 shown in FIG. 21 is attached to the outer edge 82 of a single-layer cooking utensil 83. The footing 81 may extend around the entire periphery of the utensil 83 or a plurality of footings may be spaced around the periphery of the utensil 83. In FIG. 24, a footing 84 is attached to a down-ward turned edge 85 of a single-layer cooking utensil 86. Again, a single footing 84 may extend around the edge 85 or a plurality of footings may be spaced around the edge.

The footings may be provided in a variety of shapes including, but not limited to the oblong shape of footing 34 or the round shape of footing 34a. In addition, a single ring-shaped footing may also be attached to the undersurface of a utensil.

The footings should be fabricated from a material that is strong and that has a low heat capacity and/or a high heat resistance. One preferred material is silicone rubber having a Shore A hardness of greater than 50. The specific material selected must be able to withstand temperatures of greater than 500° F.

From the above description, it is apparent that the objects of the present invention have been achieved. While only certain embodiments have been set forth, alternative embodiments and various modifications will be apparent to those skilled in the art. These and other alternative embodiments are considered equivalents and within the spirit and scope of the present invention.

We claim:

1. A cooking utensil for placement on a countertop after heating in an oven, the cooking utensil comprising:

an upper surface;

a lower surface disposed beneath the upper surface; and at least two feet made of a polymeric material and attached to the lower surface by an adhesive, the feet and the adhesive capable of withstanding a temperature of at least 450° F., the feet configured to support the lower surface of the cooking utensil above the countertop.

2. The cooking utensil of claim 1, wherein each foot is configured to span at least two wire members of an oven rack when the cooking utensil is heated in the oven.

3. The cooking utensil of claim 1, wherein the lower surface includes four edges defining four corners, and a foot is disposed near each of the four corners, each foot being disposed at substantially a 45° angle with respect to each of the edges defining the respective corner.

4. The cooking utensil of claim 1, wherein the adhesive is a silicone elastomer.

5. The cooking utensil of claim 1, wherein the upper surface is the top of an upper sheet, and wherein the lower surface is the bottom of a lower sheet, the upper and lower sheets being spaced apart and defining an insulating space therebetween.

6. A cooking utensil for heating in an oven, the oven including a rack having a plurality of wire members, and for placement on a countertop after heating in the oven, without damaging the countertop and without requiring a hot pad between the cooking utensil and the countertop, the cooking utensil comprising:

an upper surface;

a lower surface disposed beneath the upper surface; and at least one polymeric strip attached to the lower surface, the polymeric strip configured to span at least two wire members of the rack when the cooking utensil is heated in the oven, the polymeric strip further configured to support the lower surface of the cooking utensil above and to insulate the lower surface from the countertop when the cooking utensil is placed on the countertop after heating in the oven.

7. The cooking utensil of claim 6, wherein the polymeric strip is capable of withstanding a temperature of at least 450° F.

8. The cooking utensil of claim 6, wherein the lower surface includes four edges defining four corners, and a strip is disposed near each of the four corners, each strip being disposed at substantially a 45° angle with respect to each of the edges defining the respective corner.

9. The cooking utensil of claim 6, wherein each polymeric strip is attached to the lower surface by an adhesive, the adhesive capable of withstanding a temperature of at least 450° F.

10. The cooking utensil of claim 9, wherein the adhesive is a silicone elastomer.

11. The cooking utensil of claim 6, wherein each polymeric strip is attached to the lower surface by a fastener.

12. The cooking utensil of claim 6, wherein the upper surface is the top of an upper sheet, and wherein the lower surface is the bottom of a lower sheet, the upper and lower sheets being spaced apart and defining an insulating space therebetween.

13. A cooking utensil for heating on a rack in an oven and for direct placement on a countertop after heating in the oven without damaging the countertop, the cooking utensil comprising:

an upper surface;

a lower surface disposed beneath the upper surface; and at least two feet attached to the lower surface, the feet being made of a material having a Shore A hardness of at least 50 and a low heat capacity, wherein the feet support the lower surface above the rack and reduce heat conduction from the rack to the lower surface when heating in the oven, and further support the lower surface above and insulate the lower surface from the countertop when the cooking utensil is placed on the countertop after heating in the oven.

14. The cooking utensil of claim 13, wherein the lower surface includes four edges defining four corners, and a foot is disposed near each of the four corners, each foot being disposed at substantially a 45° angle with respect to each of the edges defining the respective corner and configured to span at least two wire members of the rack when the cooking utensil is heated in the oven.

15. The cooking utensil of claim 13, wherein the feet are made of a polymeric material capable of withstanding a temperature of at least 450° F.

16. The cooking utensil of claim 13, wherein the upper surface is the top of an upper sheet, and wherein the lower surface is the bottom of a lower sheet, the upper and lower sheets being spaced apart and defining an insulating space therebetween.

17. A cooking utensil for placement on a countertop when the cooking utensil is hot, the cooking utensil comprising:

an upper sheet;

a lower sheet disposed beneath the upper sheet and defining an insulating space therebetween, the lower sheet having a bottom surface; and at least one polymeric strip attached to the bottom surface, the polymeric strip configured to support the lower sheet of the cooking utensil above and to insulate the lower surface from the countertop when the cooking utensil is hot.

18. The cooking utensil of claim 17, wherein the polymeric strip is configured to support the lower surface above a rack in an oven and to reduce heat conduction from the rack to the lower surface when the cooking utensil is heated in the oven.

19. The cooking utensil of claim 17, wherein each polymeric strip is attached to the bottom surface by an adhesive.

20. The cooking utensil of claim 17, wherein each polymeric strip is attached to the bottom surface by a fastener.

* * * * *